Aug. 17, 1954

H. C. EBERLY ET AL 2,686,684

CLEVIS TYPE COUPLING

Filed June 12, 1953

Inventors:
Harry C. Eberly
James B. Gudikunst
By Richard E. Babcock Jr.
Attorney Patented Aug. 17, 1954

2,686,684

UNITED STATES PATENT OFFICE 2,686,684

CLEVIS TYPE COUPLING

Harry C. Eberly, New Holland, and James B. Gudikunst, Ephrata, Pa., assignors to The Sperry Corporation, New Holland, Pa., a corporation of Delaware Application June 12, 1953, Serial No. 361,372

6 Claims. (Cl. 280—515)

This invention relates to a draft coupling or connection for use in operatively connecting the draft tongue of a vehicle or implement to the drawbar of a tractor or other vehicle.

It has been customary to provide the draft tongue of a farm implement with a conventional clevis by means of which it may be coupled to the drawbar of a farm tractor. In the use of such conventional clevises it has been necessary for the tractor driver to avoid turning the tractor too sharply, since the angular position at which the closed end of the clevis abutted against the tractor drawbar determined the absolute limit through which the tractor might be turned relative to the implement draft tongue without risk of damage. Moreover in such conventional clevis constructions, the clevis pin has been required not only to function as a pivot but also to withstand the entire force of the pull exerted by the tractor on the implement or vehicle. Because of this, and also because of the difficulty of properly lubricating such clevis pins, same have been subject to rapid wear and have required frequent replacement.

The coupling of the present invention embodies a clevis attachment or unit which is pivotally connected to the implement draft tongue, the clevis pin being removably received in a bore extending coaxially through such pivotal connection and through both legs of the clevis, whereby after said legs have been placed in straddling relation above and below the tractor drawbar the clevis pin may be disposed through such bore and the registering hole in the drawbar to complete the connection.

Such a coupling retains the desirable features such as simplicity and ease of attachment of the above mentioned conventional clevis and pin type coupling, but relieves the clevis pin of the strain imposed when it functions as a pivot for the clevis. The pivotal connection between the clevis and the implement draft tongue provides a more rugged and easier to lubricate pivot having a considerably greater wearing surface than does the conventional clevis pin.

A further important advantage of such an arrangement is that it permits unlimited lateral swinging between the implement draft tongue and the tractor drawbar without binding of the closed end of the clevis against the drawbar as in the case of a conventional clevis and pin type coupling.

Figure 1:
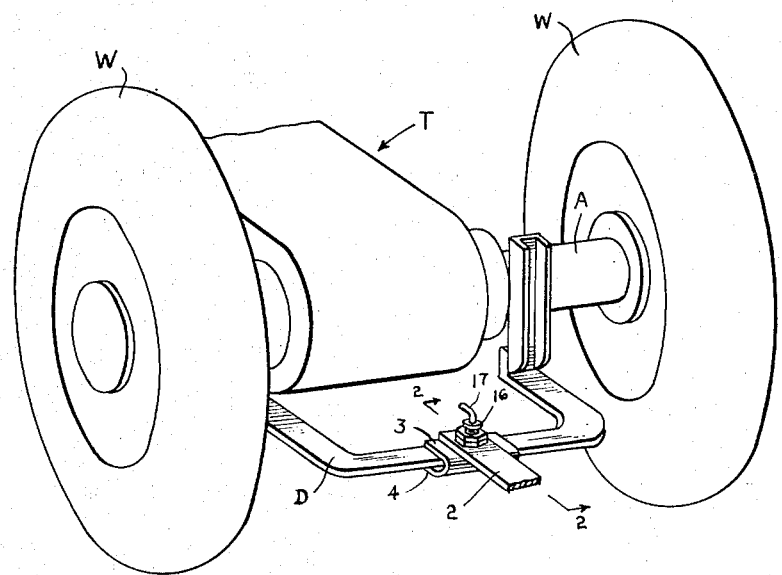
Figure 2:
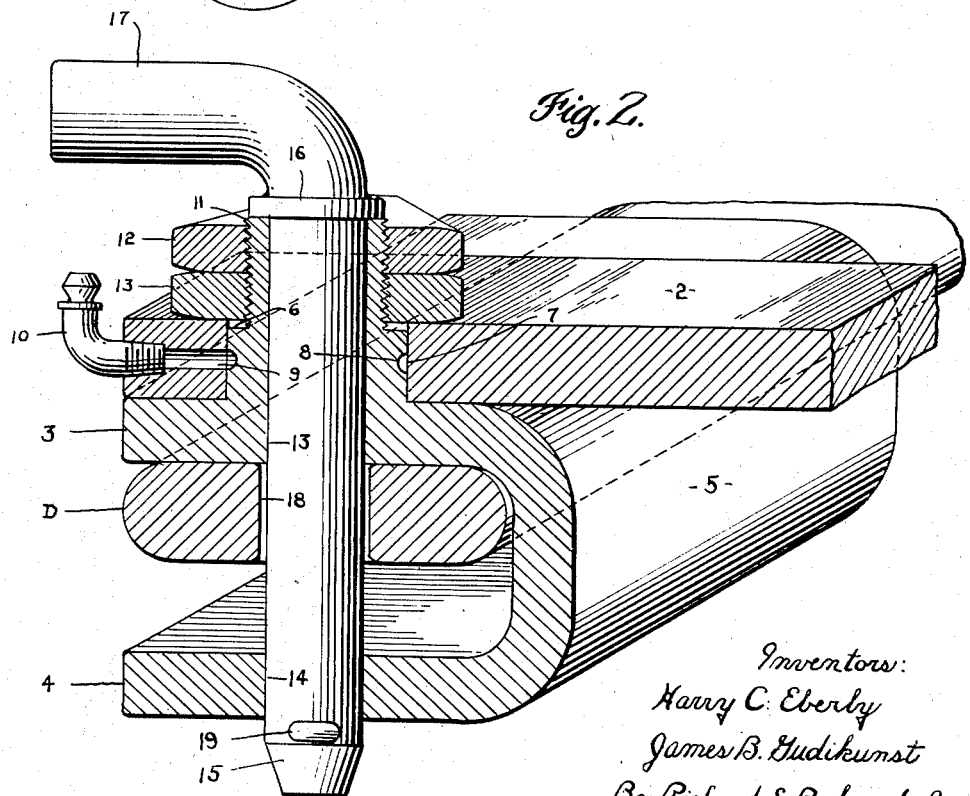

The foregoing features and advantages are all exemplified in the preferred embodiment of the invention illustrated in the accompanying drawings in which:

Figure 1 represents a perspective view showing the coupling of the invention used to connect the draft tongue of an implement to the drawbar of a farm tractor, the tractor and the draft tongue being shown in part only; and Figure 2, an enlarged cross-section through the coupling, taken on the line 2—2 of Figure 1 looking in the direction of the arrows.

Referring now in detail to the accompanying drawings, the reference character T in Figure 1 designates generally the rear end portion of a usual farm tractor having rear axle housing portions A, rear drive wheels W, and a rigid drawbar D, all arranged in conventional manner.

The reference character 2 designates the front end portion of a rigid implement draft tongue which is coupled to the drawbar D by means of the coupling of the invention. Such coupling is in the form of a clevis attachment comprising upper and lower flat plates 3 and 4 integrally connected by a bridge portion 5 in spaced parallel registering relation. It will be seen in Figure 2 that the resulting structure is of U-shaped cross-section in a vertical longitudinal plane, with the plates 3 and 4 defining the legs of the U and the bridge 5 defining the closed end thereof. A cylindrical pivot post 6 fixed on the upper plate 3 with its axis perpendicular thereto is journalled in a bore 7 in the forward end of the draft tongue 2 to thereby establish a pivotal connection between the draft tongue and the coupling. In the preferred embodiment the pivot 6 is formed with an annular groove 8 therearound which is adapted to communicate at all times with a passageway 9 formed in the draft tongue 2 and communicating at its outer end with a conventional grease fitting 10.

In order to axially retain the pivot 6 within the bore 7 the pivot post 6 is provided with an externally threaded upward extension 11 of relatively reduced diameter and lock nuts 12 and 13 operatively threaded on said extension 11 cooperate with the upper plate 3 in preventing axial displacement of the pivot post or pivot 6.

Extending coaxially through the pivot post 6, the threaded extension 11 and upper plate 3 is a bore 13. Removably disposed through said bore 13 and through a bore 14 in the lower plate 4 in alignment with the bore 13 is a clevis pin 15 which may be of any conventional construction. Clevis pin 15 is provided at its upper end with a radial flange 16 to abut against the threaded extension 11 and thus limit its downward movement through the bores 13 and 14, and also is preferably provided with an integral handle 17 to facilitate its manual insertion and removal to and from the bores 13 and 14. Accidental withdrawal of the pin 15 may be prevented by a usual cotter pin 19 disposed through the lower end of said pin beneath the plate 4.

Preferably the clevis or attachment will be proportioned as shown in Figure 2 so that when operatively associated with the drawbar D the closed end 5 of the clevis will be disposed closely adjacent the drawbar to prevent any substantial lateral swinging of the clevis or coupling about the pivot pin 15. Thus the clevis pin 15 will be relieved of the strain and the wear such as occurs in a conventional clevis type coupling where it functions as a pivot between the clevis and the drawbar. Notwithstanding its loss of function as a pivot, the clevis pin due to its coaxial location with the pivotal connection 6 between the implement draft tongue and clevis will always be located in direct alignment with the pull exerted through the draft tongue regardless of the angular position of the latter.

In the use of the invention, it is contemplated that the coupling or clevis attachment may be employed as a more or less permanent fixture on the implement draft tongue 2 for use in coupling same to the tractor drawbar D whenever desired. The clevis attachment of the invention may be operatively connected to a tractor drawbar by manually manipulating the draft tongue 2 to dispose the plates 3 and 4 of the clevis in straddling relation above and beneath the drawbar D with the bores 13 and 14 aligned with one of the conventional bores or holes 18 through the drawbar, and then manually inserting the clevis pin 15 through said aligner bores. Similarly the coupling may be broken or rendered inoperative simply by removal of the pin 15.

Thus it will be apparent that the coupling of the invention retains the desirable features such as simplicity and ease of attachment of the conventional clevis and pin type coupling, while relieving the clevis pin of the wear imposed on it in a conventional clevis arrangement wherein it functions as a pivot between the draft tongue and the drawbar. The pivot post 6 which functions as the pivot in the invention provides a more rugged and easier to lubricate pivot having a considerably greater wearing surface than the conventional clevis pin heretofore employed. Also the pivotal connection 6 between the draft tongue 2 and the clevis permits unlimited lateral swinging between the draft tongue 2 and drawbar D without binding of the closed end of the clevis against the drawbar as in the case of a conventional clevis type coupling. In addition it will be seen that by forming the clevis pin 14 of somewhat smaller diameter than the hole 18 through the drawbar, in accordance with conventional practice, the clevis attachment of the invention is permitted limited vertical swinging or rocking movement relative to the drawbar D, thereby permitting universal swinging of the draft tongue 2 as is required in practical operation. Thus the invention achieves the simplicity and ease of assembly of the conventional clevis type coupling while also providing the universal movement, the greater pivot bearing surface, and the adaptability for lubrication afforded by the conventional ball and socket type coupling.

While we have shown and described only the preferred embodiment of our invention, simply by way of setting forth the preferred mode contemplated by us of carrying out our invention, it is to be understood that changes in the details of construction and in the combination and arrangement of parts may be resorted to which will fall within the scope of the appended claims

Having thus described our invention, we claim:

1. A clevis attachment comprising upper and lower plates, a bridge portion integrally connecting said plates along corresponding edges in spaced parallel registering relation, a cylindrical pivot post fixed on said upper plate with its axis perpendicular thereto, said post having an externally threaded extension of relatively reduced diameter projecting above said post, and lock nuts threaded on said extension, said extension, pivot post, and upper plate having a bore therethrough coaxial with said pivot post, said lower plate having a bore therethrough in alignment with said first bore, in combination with a clevis pin slidably axially received in said bores.

2. A clevis attachment comprising a pair of rigid metal plates and a bridge portion integrally connecting same along adjoining edges in spaced parallel relation, a cylindrical pivot post axially perpendicularly fixed on one of said plates, said post having an externally threaded extension, said extension, pivot post and plate having a bore therethrough coaxial with said pivot post, said other plate section also having a bore therethrough in alignment with said first mentioned bore.

3. The combination comprising a draft tongue having a bore therethrough, a substantially U-shaped clevis, a tubular pivot post fixed on one leg of said clevis and journalled in said bore to pivotally connect said tongue and clevis, a clevis pin being removably coaxially disposed through said pivot post and both legs of said clevis.

4. The combination of claim 3 wherein said pivot post is formed with an annular lubricant receiving groove within said bore and said tongue is provided with a lubricant passage communicating with said groove.

5. The combination comprising a draft tongue having a bore therethrough, a substantially U-shaped clevis a tubular pivot post fixed on one leg of said clevis and journalled in said bore to pivotally connect said tongue and said clevis, both legs of said clevis being formed with bores therethrough in axial alignment with said tubular pivot post 6. The combination of claim 5 in which the said tubular pivot post is provided with an externally threaded tubular axial extension.

References Cited in the file of this patent

UNITED STATES PATENTS

| Number | Name | Date |
|---|---|---|
| 1,574,716 | Warren | Feb. 23, 1926 |
| 1,604,697 | Kegresse | Oct. 26, 1926 |
| 2,509,459 | Stamler | May 30, 1950 |
| 2,614,861 | Van Horn | Oct. 21, 1952 |
| 2,665,144 | Birdwell | Jan. 5, 1954 |